United States Patent [19]
Park et al.
[11] Patent Number: 4,871,415
[45] Date of Patent: Oct. 3, 1989

[54] APPARATUS AND METHOD FOR CURING A DEFECT IN A GRILLE FORMED ON A PANEL OF A COLOR CATHODE RAY TUBE

[75] Inventors: Yong S. Park, South Barrington; Thomas M. Remec, Des Plaines, both of Ill.

[73] Assignee: Zenith Electronics Corporation, Glenview, Ill.

[21] Appl. No.: 292,278

[22] Filed: Dec. 30, 1988

[51] Int. Cl.[4] ........................ B44C 1/22; C03C 15/00; C03C 25/06

[52] U.S. Cl. .................................... 156/626; 156/643; 156/644; 156/655; 156/345; 219/121.6; 219/121.68; 219/121.69; 427/53.1; 427/140

[58] Field of Search ............... 156/626, 643, 644, 654, 156/655, 345; 219/121.6, 121.68, 121.69; 134/1; 427/8-10, 53.1, 140, 142; 118/620, 623

[56] References Cited

U.S. PATENT DOCUMENTS

| | | | |
|---|---|---|---|
| 4,340,654 | 7/1982 | Campi | 430/5 |
| 4,727,234 | 2/1988 | Oprysko et al. | 427/53.1 X |
| 4,789,611 | 12/1988 | Miyahara | 427/53.1 X |

*Primary Examiner*—William A. Powell

[57] ABSTRACT

An apparatus is disclosed for curing a defect in a grille formed on an interior face of a color cathode ray tube panel. The apparatus includes a support structure including a first rail member onto which is mounted a camera including a magnifying lens for viewing on a display monitor the grille of the panel. The panel is seated on a positioning apparatus which allows the panel to be adjusted such that the defect to be removed is centered on cross-hairs located on the monitor. The support structure includes a second rail member to which is mounted a laser apparatus which produces a beam of laser energy to remove the defect from the grille.

27 Claims, 3 Drawing Sheets

APPARATUS AND METHOD FOR CURING A DEFECT IN A GRILLE FORMED ON A PANEL OF A COLOR CATHODE RAY TUBE

FIELD OF THE INVENTION

This invention generally relates to a grille formed on a panel of a color cathode ray tube and, more specifically, to an apparatus for curing a defect in the grille.

BACKGROUND OF THE INVENTION

Color cathode ray picture tubes, including those used in home entertainment television receivers and those used in medium-resolution and high-resolution tubes intended for CRT monitors, have a front assembly which includes a panel. The panel includes a grille formed on its interior face, a shadow mask, and means for supporting the shadow mask.

The grille is formed through a process which deposits a black matrix on the interior face of the panel. The process involves the application of polyvinyl alcohol (PVA)/sensitizer, a light-sensitive material, to the panel. Once the PVA has been applied, the panel is exposed to ultra-violet light which is passed through holes in a shadow mask. Once exposed to the ultra-violet light, the panel is rinsed in water and the PVA is washed away from areas that were not exposed to the ultra-violet light. Thereafter, a graphite solution is applied to the panel and dried to become graphite material, followed by hydrogen peroxide which attacks the PVA. The loosened graphite material is rinsed off, thereby leaving the black matrix pattern which will separate the phosphors which are applied to the panel in a later screening process.

Since the grille (i.e., black matrix) is formed by light passing through the shadow mask, it follows that the production of a nondefective grille is directly dependent on a nondefective mask. Although each shadow mask is thoroughly cleaned before the exposure step of the grille forming process, there is no way to assure that the mask holes will not become plugged in transit from the cleaning step to the exposure step. Since the mask contains approximately 800,000 holes, they can become plugged with an object as minute as a dust particle.

In effect, if any of the mask holes become plugged, the ultra-violet light is not allowed to pass therethrough and the PVA which has been applied to the panel therefore will not be exposed. The ultimate result is a defective grille including an excess amount of graphite material in an area designated for phosphor adhesion. In the industry, defective high-resolution grilles account for approximately 1 to 40% of the total volume of grilles produced.

Once a defective grille has been identified, it is customary in the industry to either wash out the panel so that it can be re-grilled, or to attempt to remove the excess graphite material from the grille.

The presently exercised means by which the excess graphite material is removed from the grille comprises the use of a microscope through which a worker views the defect, and the use of a needle or the like with which the worker can scrape or scratch away the excess material.

Clearly, there is a need in the industry for an efficient, cost-saving apparatus which will cure such defects on grilles of color cathode ray tubes.

OBJECTS OF THE INVENTION

Accordingly, an object of this invention is to provide an apparatus and method for curing a defect in a grille formed on an inner face of a color cathode ray tube panel.

Another object of the invention is to provide a low cost apparatus for removing such defects.

A further object of the invention is to provide a method for removing a defect in a color cathode ray tube grille that simplifies manufacture and obviates the need to have a defective panel re-grilled.

BRIEF DESCRIPTION OF THE DRAWINGS

The features of the invention which are believed to be novel are set forth with particularity in the appended claims. The invention, together with further objects and advantages thereof, may best be understood by reference to the following description taken in conjunction with the accompanying drawings, and the figures of which like reference numerals identify like elements, and in which:

DESCRIPTION OF THE PREFERRED EMBODIMENT

Figure 1:
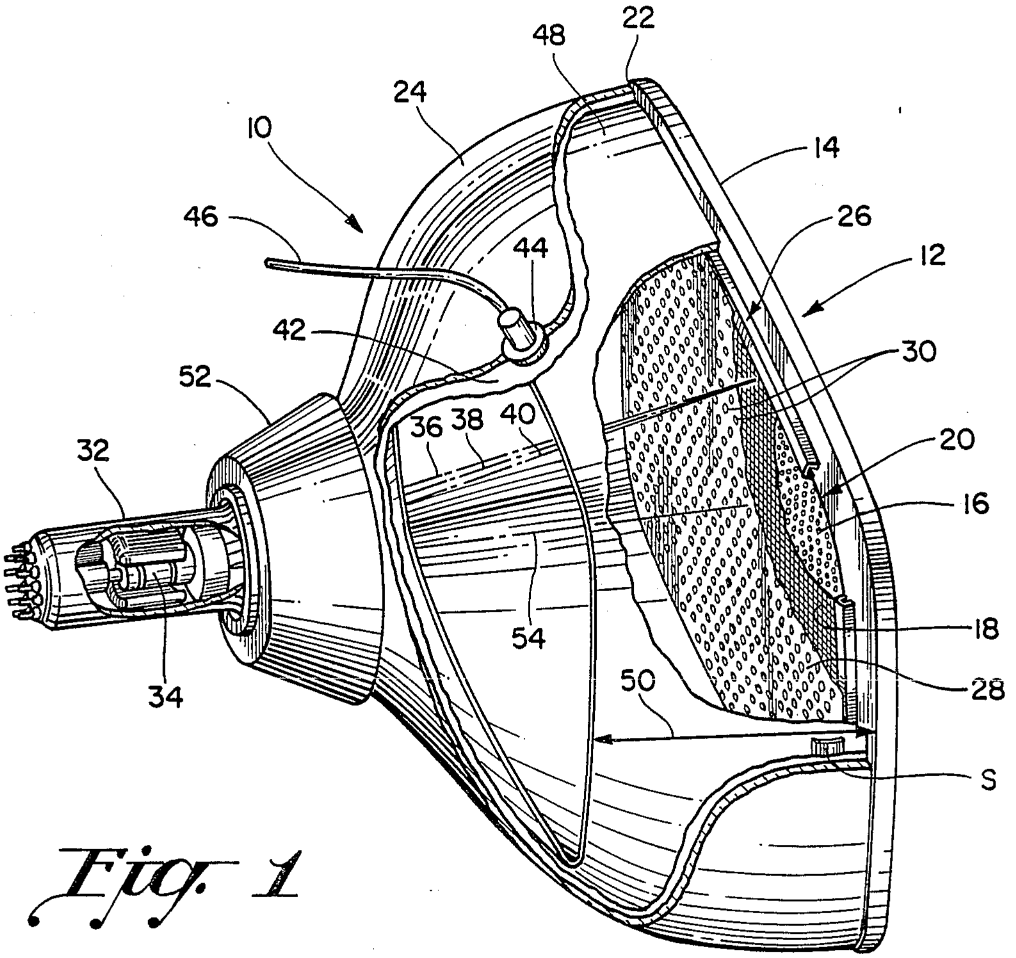
FIG. 1 is a cut-away, side perspective view of a cathode ray tube having a front assembly including a panel having a grille formed on an interior face thereof.

Referring to the drawings in greater detail, FIG. 1 depicts a color cathode ray tube, generally designated 10, having a front assembly 12. As shown therein, the front assembly 12 includes a panel 14 having a grille 16 on an interior face (not shown). The grille 16, during manufacture, receives a uniform coat of phosphor deposits 18. A conductive film (not shown), which is deposited on phosphor deposits 18 in a final step, consists of a very thin, light-reflective, electron-pervious film of aluminum. The grille 16, along with phosphor deposits 18, and the aluminum film (not shown) comprises a screen, generally designated 20.

The screen 20 is surrounded by a peripheral sealing area 22 which is adapted to be mated with a funnel 24. The front assembly 12 includes a tension foil shadow mask support structure, generally designated 26, secured to the interior face of the panel 14 between the screen 20 and peripheral sealing area 22 and enclosing the grille 16. The support structure provides for supporting a tension foil shadow mask 28 including a plurality of holes 30, a predetermined distance from the interior face of the panel 14. The mask 28, indicated as being planar, is depicted as being stretched in all directions in the plane of the mask.

A neck 32 extending from the funnel 24 is represented as housing an electron gun 34 which is indicated as emitting three electron beams 36, 38, and 40 which selectively activate the phosphor deposits 18. The beams 36, 38 and 40 serve to selectively activate the pattern of phosphor deposits 18 after passing through the paralax barrier formed by the shadow mask 28.

The funnel 24 is indicated as having an internal electrically conductive funnel coating 42 adapted to receive a high electrical potential. The potential is depicted as being applied through an anode button 44 attached to a conductor 46 which conducts the high electrical potential to the anode button 44 through the wall of funnel 24. The source of the potential is a high-voltage power supply (not shown). The potential may be, for example, in the range of 8 to 26 kilovolts in the illustrated monitor application. Means for providing an electrical connection between the electrically conductive support structure 26 and funnel coating 42 may comprise a spring means S.

A magnetically permeable internal magnetic shield 48 is shown as being attached to support structure 26. Shield 48 extends into funnel 24 a predetermined distance 50 which is calculated so that there is no interference with the excursion of the electron beams 36, 38, and 40, yet maximum shielding is provided.

Finally, a yoke 52 is shown as encircling tube 10 in the region of the junction between funnel 24 and neck 32. Yoke 52 provides for the electromagnetic scanning of beams 36, 38, and 40 across the screen 20. A center axis 54 of tube 10 is indicated by the broken line.

Figure 2:
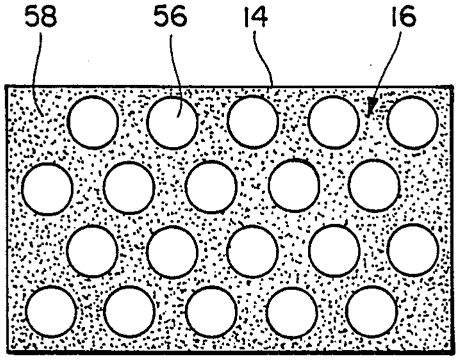
FIG. 2 is a plan view, on an enlarged scale, of a grille on an interior face of a panel.

FIG. 2 shows, on an enlarged scale, a section of grille 16 on the interior face of a portion of a panel 14. The grille 16 (i.e., black matrix) is formed through a grille process which, although not shown herein, is described below in detail.

At the start of the process, the panel 14 is loaded into a grille machine which coats the interior face of the panel with polyvinyl alcohol (PVA)/sensitizer, a material which reacts chemically when exposed to ultraviolet (UV) light. The panel is rotated so that the PVA is evenly distributed. The PVA then is dried by heating.

At that time, the mask is placed in the panel 14. The panel is then placed onto an exposure table which produces UV light which shines through the holes in the mask and onto the PVA on the panel. The PVA which is exposed to UV light becomes water insoluble and sticks to the glass of the panel. In FIG. 2, the dots 56 represent those areas of the panel which initially are exposed to UV light.

Thereafter, the panel is taken from the exposure table and the mask is removed. The panel then is rinsed in dionized water which washes away all of the PVA which was not exposed to the UV light. Thereafter, a graphite solution is applied to the interior face of the panel and dried by heating to become a graphite material. The panel then is rinsed in hydrogen peroxide which chemically attacks the PVA through the porous graphite material. Thereafter, a high pressure water spray washes the panel and rinses away the graphite material which covered the tiny dots of PVA, leaving intact only the graphite material applied directly to the glass. In FIG. 2, the dots 56, in turn, represent those areas from which the graphite material was rinsed, leaving intact only the graphite material 58 applied directly to the glass of the panel 14.

As shown in FIG. 2, the remaining graphite material 58 forms the grille 16 which will separate the phosphors applied over the dots 56 in a screening process.

It is noted that the above-mentioned process likewise is applicable wherein the shadow mask contains a plurality of slots, rather than a plurality of dots or holes.

Figure 3:
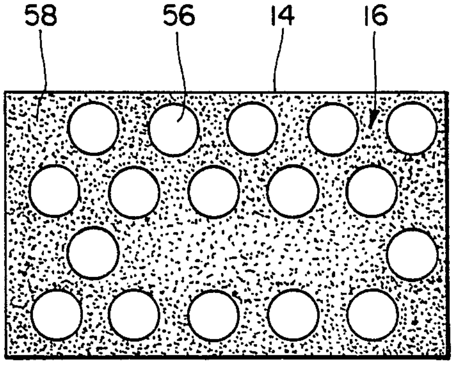
FIG. 3 is a plan view, on an enlarged scale, of a defective grille on an interior face of a panel.

FIG. 3 shows, on an enlarged scale, a section of grille 16 which is defective since it does not include all of the dots 56 depicted in the grille 16 of FIG. 2. The absence of the dots 56 is directly attributable to a shadow mask 28 having its corresponding holes 30 plugged up by a dust particle, or the like, during the aforementioned exposure step of the grilling process. As a result, light is not allowed to shine through the plugged holes of the mask 28 and onto the PVA on the panel 14. In FIG. 3, it is noted that the absence of three dots 56 corresponds to the plugging up of a single hole 30 in the mask 28 since three dots are formed on the panel 14 for every hole 30 in the mask 28. That is, while the grille 16 contains approximately two and one-half million dots 56, the shadow mask 28 contains only one-third the number of holes 30.

Although not shown in FIG. 3, it is noted that a grille 6 is considered defective not only wherein it does not include all of the dots 56 due to a plug in a hole 30 of shadow mask 28 but, also, wherein a portion of dot 56 may be missing due to a portion of a hole 30 in shadow mask 28 being plugged up by a dust particle, or the like. Additionally, a portion of dot 56 may be missing due to a piece of lint, or the like falling on the polyvinyl alcohol (PVA)/sensitizer after its application to the panel but before its exposure to ultra-violet light. The above will result in the nonexposure of the PVA located beneath the piece of lint and, ultimately, in a grille 16 having a portion of dot 56 missing.

Figure 4:
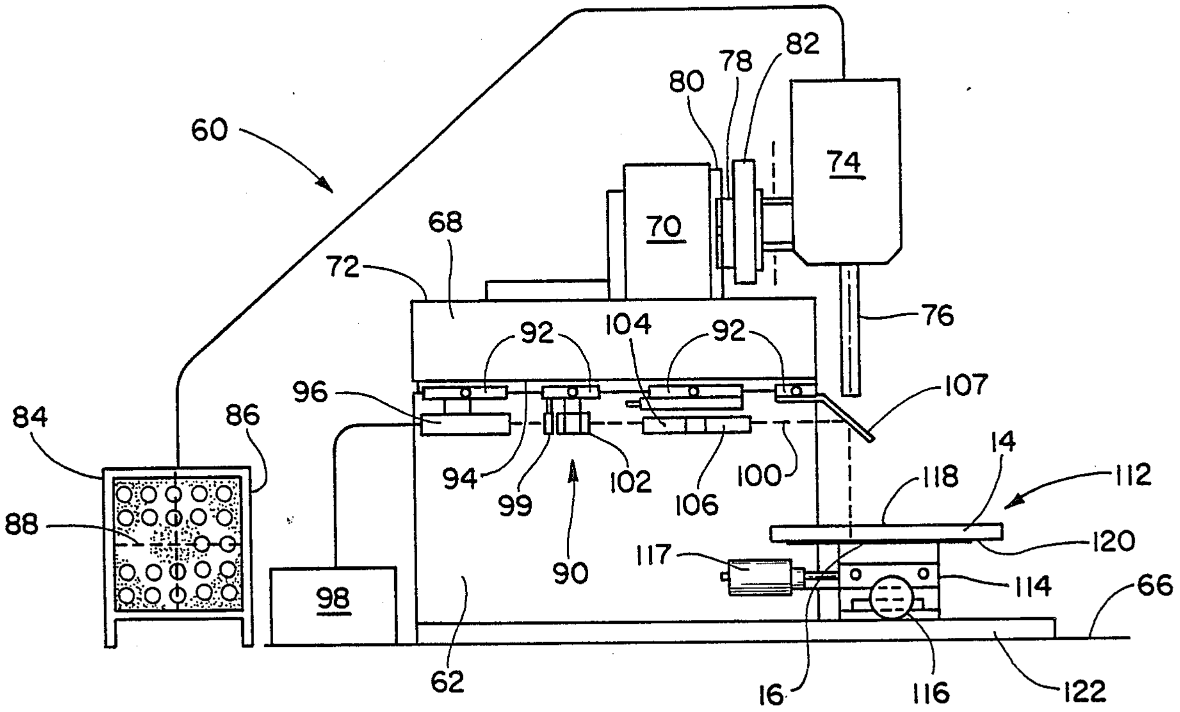
FIG. 4 is a perspective view of an apparatus for curing a defect in a grille according to the invention.

FIG. 4 shows an apparatus according to the present invention for removing the excess graphite material on a grille 16 such as that shown in FIG. 3 such that, when removed, the grille will appear as that shown in FIG. 2.

The apparatus, generally designated 60, includes a supporting member 62 including a flange portion 64 (see FIG. 5) securing the apparatus to a surface 66. Attached to the supporting member 62 is a horizontal optical rail member 68. In turn, a vertical optical rail member 70 is attached to an upper surface 72 of the horizontal rail member.

A camera 74, including a 60X magnifying lens 76, is mounted to the optical rail member 70 by means of a carrier 78 fixed to a web 80 of the rail member 70. Further, a slide 82 is mounted to the camera 74 to allow the same to be adjusted. The camera 74 is connected to a display monitor 84 including a screen 86 having a cross-hair pattern 88.

A laser apparatus, generally designated 90, is mounted to the horizontal member 68 by means of a plurality of carriers 92 attached to a web 94 extending the length of a lower surface of the member 68. The laser apparatus 90 includes a laser 96, located at one end of the member 68, which is connected to a power supply source 98. The laser apparatus 90 further includes an aperture holder 99 including an aperture (not shown) for cutting down the energy and reducing the size of a beam 100 (shown in dotted lines) produced by the laser 96, a Risley wedge beam-steering assembly 102 for directing the beam 100 in conformity with the location of the cross-hair pattern 88 on the screen 86 of the monitor 84, a laser beam expander 104, a focusing lens 106 for focusing the beam 100, and a dichroic beamsplitter 107 fixed to the other end of the member 68.

Figure 5:
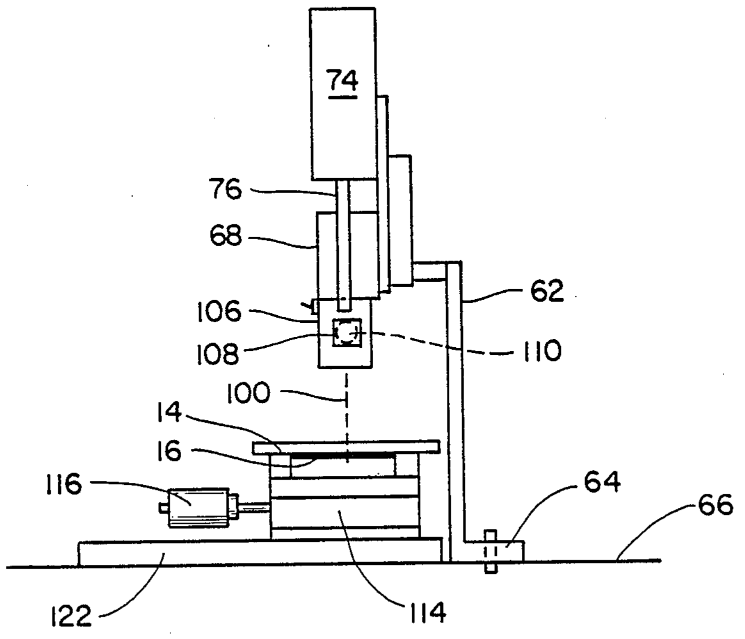
FIG. 5 is a perspective view of the front end of the apparatus shown in FIG. 4.

As shown in FIGS. 4 and 5, the members 68, 70 are fixed perpendicular to each other such that the lens 76 of the camera 74 fixed to member 70 is located above said dichroic beam-splitter 107.

According to the invention, the laser 96 is an Nd:YAG laser or the like having a power capability of 17 mJ/pulse which may be connected to a power supply 98 with electronics (not shown) for triggering the laser 96. The laser 96 is capable of producing a beam with a diameter of 2.5 millimeters whose divergence is less than 2 milliradians. The pulse width of the laser 96 is 7 nanoseconds. The dichroic beam-splitter 107, as shown in FIG. 5, includes a mirror 108 having a transmissive coating 110 on the side adjacent the magnifying lens 76 and a reflective coating (not shown) on the other side thereof.

Beneath the camera 74, is located a positioning apparatus, generally designated 112, which includes a portion 114 moveable in the x and y directions by means of positioning devices 116 and 117, respectively. A portion of a panel 14 including an exterior face 118 is shown on top of the positioning apparatus 112 with its interior face 120 including the grille 16 resting on the upper surface of the positioning apparatus.

Finally, the apparatus 60 includes a light table 122 which allows the interior face of the panel 14 to be illuminated for viewing purposes.

According to the preferred method of using the apparatus of the present invention, the panel 14 is placed on top of the positioning apparatus 112, as shown in FIGS. 4 and 5, such that the interior face is seated on the positioning apparatus. Since the dichroic beam-splitter 107 includes mirror 108 having transmissive coating 110 on the side adjacent the camera lens 76, the monitor 84 will display the grille 16 formed on the panel 14.

At this time, the positioning apparatus 112 may be used to move the panel in the x or y directions by means of devices 116, 117, such that the portion of the grille 16 from which the excess graphite material is to be removed, is located and centered on the cross-hair pattern 88 on the screen 86 of the monitor 84, as shown in FIG. 4. Once the panel 14 has been so adjusted, the laser 96 is activated to produce beam 100 of laser energy as shown in FIG. 4.

Figure 6:
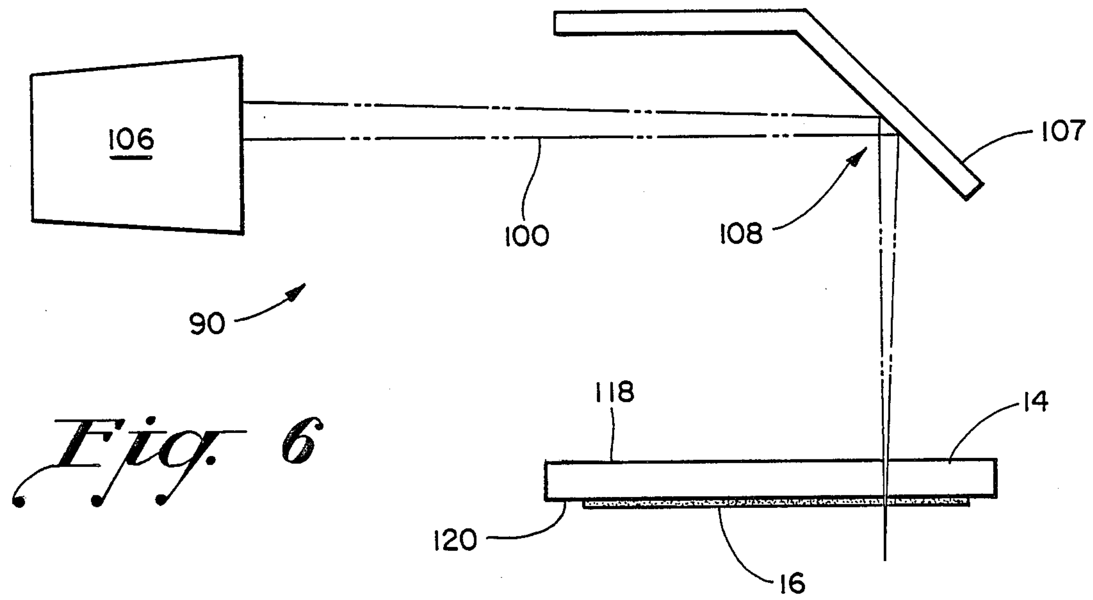
FIG. 6 is a somewhat schematic representation, on an enlarged scale, of the travel of a laser beam produced by the apparatus of the invention.

As shown on an enlarged scale in FIG. 6, the laser apparatus 90 is focused such the beam 100 contacts the mirror 108 on the side containing the reflective coating and deflects thereof to strike the panel 14.

Figure 7:
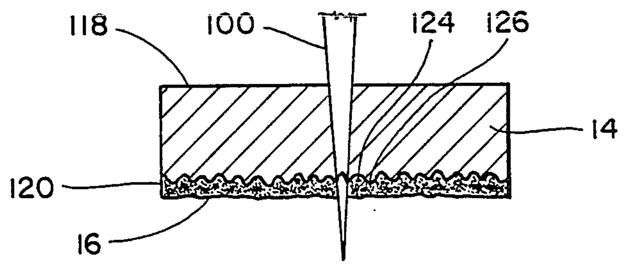
FIG. 7 is a somewhat schematic representation, on an enlarged scale, of the travel of the laser beam through the panel.

FIG. 7 shows the panel 14 on a magnified scale. As shown therein, in conventional panels, the exterior face 118 is polished while the interior face 120 is etched or frosted and thereby includes valleys 124 and crowns 126. As further shown therein, the beam 100 strikes the exterior face 118 of the panel, travels through the panel 14, and vaporizes a thin layer of graphite material at the graphite-glass interface including that graphite material lodged within the valleys 124 and crowns 126 of the frosted interior face 120. The above-described method is superior to the prior art method since, in the prior art method, the worker can only scrape or scratch away the excess material located on crowns 126 but not in valleys 124.

The vaporization of the excess material produces a dot comparable in diameter to the dots 56 already formed on the grille 16, as shown in FIGS. 2 and 3. It is noted that the size of the dot produced may be varied to accommodate the removal of a defect in a grille 16 wherein only a portion of dot 56 is missing for whatever reason. The size of the dot may be varied either by replacing apertures thereby varying the diameter of beam 100, or by adjusting the distance between focusing lens 106 and positioning apparatus 112 thereby varying the focal point of beam 100.

Once the dot has been produced, the positioning apparatus 112 may, once again, be used to move the panel 14 in the x or y directions such that the cross-hair pattern 88 is centered on the next location where the excess material is to be removed.

According to the invention, it is desirable to place the panel 14 on the positioning apparatus 112 with the interior face 120 seated on the top surface thereof such that the beam 100 must travel through the panel 14 to reach the grille 16. If the panel 14 is placed such that the exterior face 118 is seated on the positioning apparatus 112, the beam 100 is forced to remove the graphite material layer by layer through the use of successive bursts of energy rather than with a single burst, as in the present invention. Further, the process will leave oxidized graphite material (i.e., scorch marks) around the dot which has been created and this will interfere with subsequent chemical operations.

According to the invention, and as shown in FIG. 7, it is further desirable to focus the beam 100 such that it concentrates at a point below the panel 14 to avoid glass damage which would result if the beam 100 were allowed to concentrate within the panel 14.

Finally, it is noted that the above-described apparatus 60 and method for curing a defect in a grille 16 likewise is applicable to remove a plug in a hole 30 of a shadow mask 28.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. An apparatus for curing a defect in a grille formed on an interior face of a color cathode ray tube panel, comprising:

means for locating that portion of the grille on said panel containing the defect, said defect comprising excess material on the interior face of said panel; and means mounted on a support structure for removing the defect from the grille once the defect has been located.

2. The apparatus of claim 1 wherein said means for locating said defect comprises means mounted on said support structure for viewing said grille on said panel and means for positioning said panel such that the defect on said grille is viewable.

3. The apparatus of claim 2 wherein said viewing means comprises a camera including a magnifying lens, said camera being connected to a display monitor so that the defect is viewable thereon.

4. The apparatus of claim 3 wherein said support structure includes a member to which said camera is mounted, said camera being mounted to said member by means of a carrier.

5. The apparatus of claim 2 wherein said means for positioning the panel such that the defect on said grille is viewable comprises a structure movable in x and y directions.

6. The apparatus of claim 5 wherein said panel is positioned such that the exterior face thereof is directly opposite said viewing means.

7. The apparatus of claim 1 wherein said means for removing said defect from said grille on said panel comprises a laser apparatus mounted to said support structure, said laser apparatus producing a beam of laser energy which vaporizes said excess material.

8. The apparatus of claim 7 wherein said support structure includes a member to which said laser apparatus is mounted.

9. The apparatus of claim 8 wherein said laser apparatus includes laser means, an aperture holder, a beam steering assembly, a beam expander, a focus lens, and a dichroic beam-splitter, said laser apparatus being mounted to said member by means of a plurality of carriers.

10. An apparatus for curing a defect in a grille formed on an interior face of a color cathode ray tube panel, comprising:

- a camera mounted on a support structure, said camera being connected to a display monitor so that the grille on said panel is viewable;
- means for positioning said panel such that said defect on said grille may be viewed, said defect being comprised of excess material on the interior face of said panel; and
- a laser apparatus mounted to said support structure for removing said defect, said laser producing a beam of laser energy which vaporizes said defect.

11. The apparatus of claim 10 wherein said camera is mounted to a first member on said support structure by means of a carrier, said carrier further including a slide so that the position of the camera may be adjusted.

12. The apparatus of claim 10 wherein said means for positioning the panel comprises a structure movable in x and y directions, said panel being positioned so that the defect to be removed is visible on said monitor and centered on cross-hairs thereon.

13. The apparatus of claim 12 wherein the panel is positioned such that the exterior face thereof is directly opposite the camera.

14. The apparatus of claim 10 wherein said means for removing the defect from said grille comprises a laser apparatus, said laser apparatus producing a beam of laser energy which vaporizes the excess material on said grille and centered on said cross-hairs of said monitor.

15. The apparatus of claim 14 wherein said laser apparatus comprises laser means, an aperture holder, a beam steering assembly, a beam expander, a focus lens and a dichroic beam-splitter.

16. The apparatus of claim 15 wherein said laser apparatus is mounted to a second member on said support structure by means of a plurality of carriers.

17. An apparatus for curing a defect in a grille formed on an interior surface of a color cathode ray tube panel, comprising:

- a camera mounted on a support structure, said camera being connected to a display monitor so that said grille on said panel is viewable;
- means for positioning the panel such that the defect on said grille is viewable on said monitor and centered on cross-hairs thereon; and
- a laser apparatus mounted on said support structure for removing said defect on said grille centered on said cross-hairs of said monitor, said laser apparatus producing a beam of laser energy which vaporizes said defect.

18. The apparatus of claim 17 wherein said camera is mounted to a member on said support structure by means of a carrier.

19. The apparatus of claim 17 wherein said laser apparatus comprises laser means, an aperture holder, a beam steering assembly, a beam expander, a focus lens and a dichroic beam-splitter.

20. The apparatus of claim 14 wherein said laser apparatus is mounted to a member on said support structure by means of a plurality of carriers.

21. A method for curing a defect in a grille formed on an interior face of a color cathode ray tube panel, comprising the steps of:

(a) viewing said grille on said panel by means of a camera mounted on a support structure, said camera including a magnifying lens and being connected to a display monitor so that the grille is viewable;

(b) positioning said panel such that the defect may be viewed, said defect being comprised of excess material of the grille on said panel; and (c) removing the defect by means of a laser apparatus mounted to said support structure, said laser apparatus producing a beam of laser energy which vaporizes said excess material.

22. The method of claim 21 wherein said display monitor includes a screen having cross-hairs, and said panel is positioned such that said defect is centered on said cross-hairs.

23. The method of claim 21 wherein said panel is positioned such that the exterior surface of said panel is directly opposite said camera.

24. The method of claim 21, including adjusting the laser such that the beam of laser energy travels through the panel and focuses at a point on a side of the panel opposite the laser apparatus.

25. A method of curing a defect in a grille formed on an interior face of a panel of a color cathode ray tube panel, comprising the steps of:

(a) viewing said grille on said panel by means of a camera mounted on a support structure, said camera including a magnifying lens and being connected to a display monitor so that the grille is viewable on a screen;

(b) positioning the panel such that the portion of the grille containing the defect to be removed is centered on cross-hairs located on the screen; and (c) removing the defect by means of a laser apparatus mounted to said support structure, said laser apparatus producing a beam of laser energy which vaporizes excess material of the defect centered on the cross-hairs of said monitor screen.

26. The method of claim 25 wherein said panel is placed below said camera such that the exterior surface of said panel is directly opposite said camera.

27. The method of claim 25, including adjusting the laser apparatus so that the beam of laser energy travels through the panel and focuses at a point on a side of the panel opposite the laser apparatus.

* * * * *